United States Patent [19]

Ikeno et al.

[11] Patent Number: 5,225,942
[45] Date of Patent: Jul. 6, 1993

[54] OPTICAL SIGNAL BAND-PASS FILTER MODULE

[75] Inventors: Hideki Ikeno; Kazuhiro Ohki, both of Tokyo, Japan

[73] Assignee: Ando Electric Co., Ltd., Tokyo, Japan

[21] Appl. No.: 823,317

[22] Filed: Jan. 21, 1992

[30] Foreign Application Priority Data

Feb. 25, 1991 [JP] Japan .................... 3-53406

[51] Int. Cl.$^5$ .................... G02B 5/04; G02B 5/20; G02B 6/34
[52] U.S. Cl. ................... 359/836; 385/31; 385/36
[58] Field of Search ........... 359/836, 589, 885, 891, 359/892; 385/36, 31, 26

[56] References Cited

U.S. PATENT DOCUMENTS

| | | | |
|---|---|---|---|
| 4,569,569 | 2/1986 | Stewart | 385/36 |
| 4,589,726 | 5/1986 | Buhrer | 385/36 |

FOREIGN PATENT DOCUMENTS

| | | | |
|---|---|---|---|
| 102817 | 8/1981 | Japan | 385/36 |
| 147106 | 11/1981 | Japan | 385/36 |
| 14803 | 1/1982 | Japan | 385/36 |
| 139704 | 8/1982 | Japan | 385/36 |

*Primary Examiner*—Jon W. Henry
*Attorney, Agent, or Firm*—Flynn, Thiel, Boutell & Tanis

[57] ABSTRACT

An optical signal band-pass filter module permitting a light which is transmitted through a band-pass filter twice so that the central wavelength in a transmittance bandwidth thereof is prevented to be varied. The optical signal band-pass filter comprises a first optical fiber for emitting a first light, a first lens connected to the first optical fiber by way of a holder for converting the first light into a parallel light, a band-pass filter which is confronted with the first lens, on which the parallel light is incident, a right-angled prism confronted with the band-pass filter, the right-angled prism capable of turning the traveling direction of the parallel light after it has been transmitted through the band-pass filter, reversing the light after it has been reflected thereby, and of permitting the reversed light incident on the band-pass filter, a second lens confronted with the band-pass filter, the second lens capable of collecting the reversed light after it has been transmitted through the band-pass filter, and a second optical fiber connected to the second lens by way of a second holder through which the reversed light is emitted.

1 Claim, 2 Drawing Sheets

OPTICAL SIGNAL BAND-PASS FILTER MODULE

BACKGROUND OF THE INVENTION

1. Field of the Invention

The present invention relates to a band-pass filter module, particulary to an optical signal band-pass filter module for taking out light having only a specific wavelength from lights having wide band-width wavelengths.

2. Prior Art

FIG. 2 shows an arrangement of a conventional band-pass filter module. The arrangement comprises a case 7, band-pass filters 3A and 3B disposed at bottom surface of the case 7, lenses 2A and 2B disposed at side surfaces of the case 7, a first optical fiber 1A connected to the lens 2A by way of a holder 6A and a second optical fiber 1B connected to the lens 2B by way of a holder 6B. Light 11 which is incident on the first optical fiber 1A is converted into a parallel light 12 by the lens 2A. After the parallel lights 12 is transmitted through both the band-pass filters 3A and 3B, they are collected by the lens 2B and thereafter incident on the second optical fiber 1B.

FIG. 3 is a graph showing a transmittance/wavelength characteristic when the lights transmit the band-pass filters 3A and 3B, in which the horizontal axis represents transmittance and the vertical axis represents wavelength. The transmittance in a transmittance allowing bandwidth is represented as 22 in a characteristic curve while the transmittance in a transmittance preventing bandwidth is represented as 21 and 23 in the characteristic curve. Accordingly, obtained in the arrangement as illustrated in FIG. 2 is difference between the transmittance in the transmittance allowing bandwidth and the transmittance in the transmittance preventing bandwidth (non-transmittance) doubled by the two band-pass filters 3A and 3B.

In the arrangement of the conventional band-pass filter module as illustrated in FIG. 2, two band-pass filters 3A and 3B are used for obtaining high non-transmittance which can not be obtained by a single band-pass filter. However, it is the actual circumstances that the band-pass filters are not uniformly manufactured even in the same manufacturing lot.

FIG. 4 is a graph showing transmittance/wavelength characteristic in the band-pass filters 3A and 3B. Designated as 24 and 25 are curves representing transmittance/wavelength characteristic and 26 is a curve representing totaled transmittance/wavelength charateristic. $\lambda a$ represents a central wavelength in a transmittance bandwidth of the band-pass filter 3A, $\lambda b$ represents a central wavelength in a transmittance bandwidth of the band-pass filter 3B and $\lambda_0$ represents a central wavelength in a totaled transmittance bandwidth wherein the following expression is established.

$$\lambda_0 = (\lambda a + \lambda b)/2, \Delta\lambda = (\lambda a - \lambda b)$$

Since a synthetic characteristic in the arrangement of the band-pass filter module in FIG. 2 shows that when the wavelength difference $\Delta\lambda$ exists, the transmittance factor in the totaled transmittance bandwidth is reduced even if the transmittance prevention factor is assured to some extent, thereby increasing transmittance loss as the band-pass filter. As a result, it is necessary to previously combine the lenses having central wavelenghts $\lambda a$ and $\lambda b$ which are close to each other.

SUMMARY OF THE INVENTION

It is an object of the present invention to provide an optical signal band-pass filter module capable of eliminating of one of the band-pass filters as illustrated in FIG. 2 by permitting the light to be transmitted through a single band-pass filter twice.

To achieve the above object, the optical signal band-pass filter module according to the present invention permitting a light to be transmitted through a band-pass filter twice so that the central wavelength in a transmittance bandwidth thereof is prevented to be varied. The optical signal band-pass filter comprises a first optical fiber for emitting a first light, a first lens connected to the first optical fiber by way of a holder for converting the first light into a parallel light, a band-pass filter which is confronted with the first lens, on which the parallel light is incident, a right-angled prism confronted with the band-pass filter, the right-angled prism capable of turning the traveling direction of the parallel light after it has been transmitted through the band-pass filter, reversing the light after it has been reflected thereby, and of permitting the reversed light incident on the band-pass filter, a second lens confronted with the band-pass filter, the second lens capable of collecting the reversed light after it has been transmitted through the band-pass filter, and a second optical fiber connected to the second lens by way of a second holder through which the reversed light is emitted.

PREFERRED EMBODIMENT OF THE INVENTION

Figure 1:
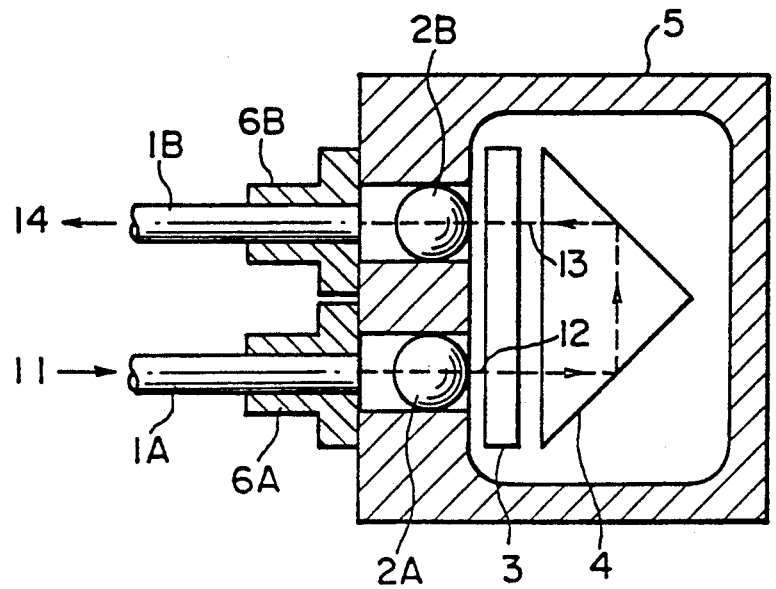
FIG. 1 is a cross-sectional view of a band-pass filter module according to a preferred embodiment of the present invention.

An optical signal band-pass filter module according to a preferred embodiment will be described with reference to FIG. 1.

The optical signal band-pass filter comprises a case 5, a band-pass filter 3 and a right-angled prism 4 respectively disposed at the bottom surface of the case 5, first and second lenses 2A and 2B respectively disposed at side surfaces of the case 5 and first and second optical fibers which are respectively connected to the first and second lenses 2A and 2B by way of first and second holders 6A and 6B.

Figure 2:
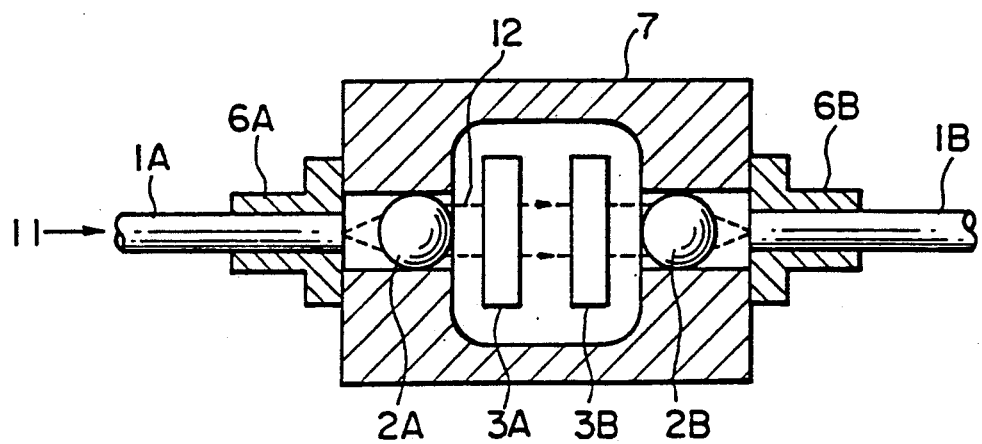
FIG. 2 is a cross-sectional view of a conventional band-pass filter module.
Figure 3:
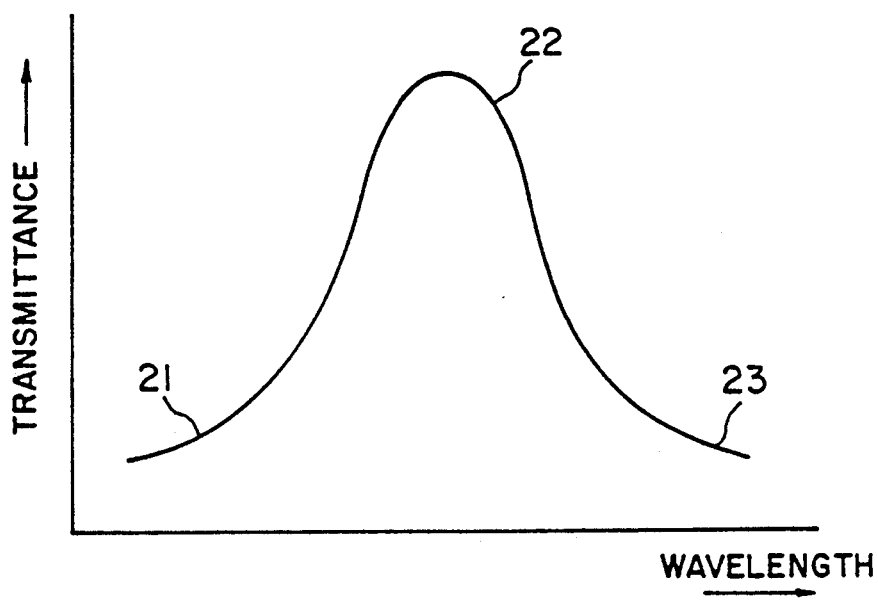
FIG. 3 is a graph showing a transmittance/wavelength characteristic.

With such an arrangement, a light 11 is incident on the first optical fiber 1A, emitted from the same, and converted into a parallel light 12 by way of the first lens 2A. The parallel light 12 is incident on the band-pass filter 3, transmitted through the same and turned in its traveling direction by the right-angled prism 4. The reversed light is denoted at 13 and incident on the same band-pass filter 3 from the back side thereof. The reversed light 13 which has been transmitted again through the band-pass filter 3 is collected by the second lens 2B and converted into a light 14. The light 14 is incident on the second optical fiber 1B and emitted from the same. The band-pass filter 3 has the same transmittance/wavelength characteristic as that of the conventional band-pass filter as illustrated in FIG. 2.

Figure 4:
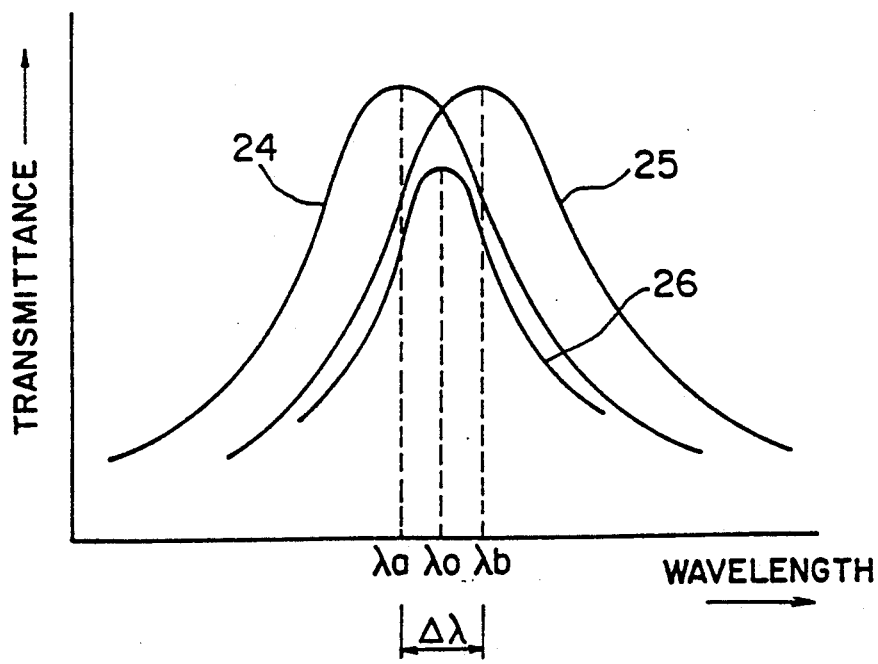
FIG. 4 is a graph showing a transmittance/wavelength characteristic of the band-pass filters of the conventional band-pass filter module in FIG. 2.

As described above, since the light is transmitted through the single band-pass filter twice, it is possible to provide the optical signal band-pass filter module having small wavelength difference $\Delta\lambda$ which is illustrated in FIG. 4.

What is claimed is:

1. An optical signal band-pass filter module comprising:
    a first optical fiber for emitting a first light;
    a first lens connected to the first optical fiber by way of a holder for converting the first light into a parallel light;
    a band-pass filter which is confronted with the first lens, on which the parallel light is incident;
    a right-angled prism confronted with the band-pass filter, the right-angled prism capable of turning the traveling direction of the parallel light after it has been transmitted through the band-pass filter, reversing the light after it has been reflected thereby, and of permitting the reversed light incident on the band-pass filter;
    a second lens confronted with the band-pass filter, the second lens capable of collecting the reversed light after it has been transmitted through the band-pass filter; and
    a second optical fiber connected to the second lens by way of a second holder through which the reversed light is emitted.

* * * * *